United States Patent [19]

Dancy

[11] 3,896,340

[45] July 22, 1975

[54] APPARATUS AND METHOD FOR WASHING AWAY AN ELECTROSTATIC CHARGED MIST IN AN OIL TANKER

[75] Inventor: Julian H. Dancy, Richmond, Va.

[73] Assignee: Texaco Inc., New York, N.Y.

[22] Filed: Aug. 23, 1973

[21] Appl. No.: 390,802

[52] U.S. Cl.................. 317/2 R; 134/22 R; 239/3; 239/15
[51] Int. Cl.............................................. H05f 3/00
[58] Field of Search .......... 239/15, 3; 317/2 R, 2 D, 317/2 E; 118/629, 621, 627; 134/10, 22 R, 24

[56] References Cited
UNITED STATES PATENTS

| | | | |
|---|---|---|---|
| 632,185 | 8/1899 | Jones | 317/2 R X |
| 2,065,462 | 12/1936 | Olsson | 134/22 R |
| 3,121,027 | 2/1964 | Galanor | 134/10 |
| 3,164,747 | 1/1965 | Yahnke | 317/2 R |
| 3,188,238 | 6/1965 | Lyon | 134/22 R X |
| 3,384,446 | 5/1968 | Ziems et al. | 239/3 X |
| 3,728,156 | 4/1973 | Miller | 134/10 |
| 3,730,193 | 5/1973 | Armistead | 134/10 |
| 3,802,625 | 4/1974 | Buser et al. | 239/15 |

Primary Examiner—Robert S. Ward, Jr.
Assistant Examiner—Randolph A. Reese
Attorney, Agent, or Firm—T. H. Whaley; C. G. Ries; Ronald G. Gillespie

[57] ABSTRACT

The apparatus and method permits an electrostatic field strength of a charged mist in a substantially empty hold of a tanker to be reduced safely. The apparatus includes a head having nozzles receiving a supply of water at a predetermined location in the hold of the tanker. Each nozzle converts the water to drops. As the water is converted to drops, each drop acquires a charge in the presence of the electrostatic field of the charged mist opposite in polarity to the polarity of the electrostatic field. The droplets are distributed throughout the hold so that they impact with the mist droplets to substantially neutralize the mist droplets and wash away the mist to effectively reduce the strength of the electrostatic field except for a low residual field well within safety limits. The coalescence between a drop and a mist droplet is enhanced by the difference in their charges.

7 Claims, 2 Drawing Figures

PATENTED JUL 22 1975     3,896,340
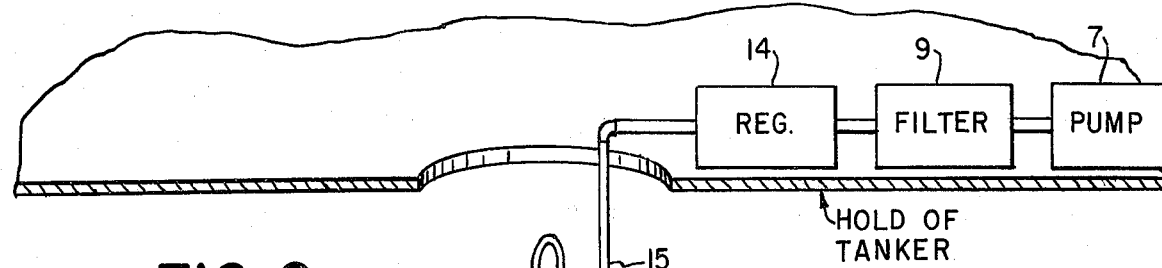
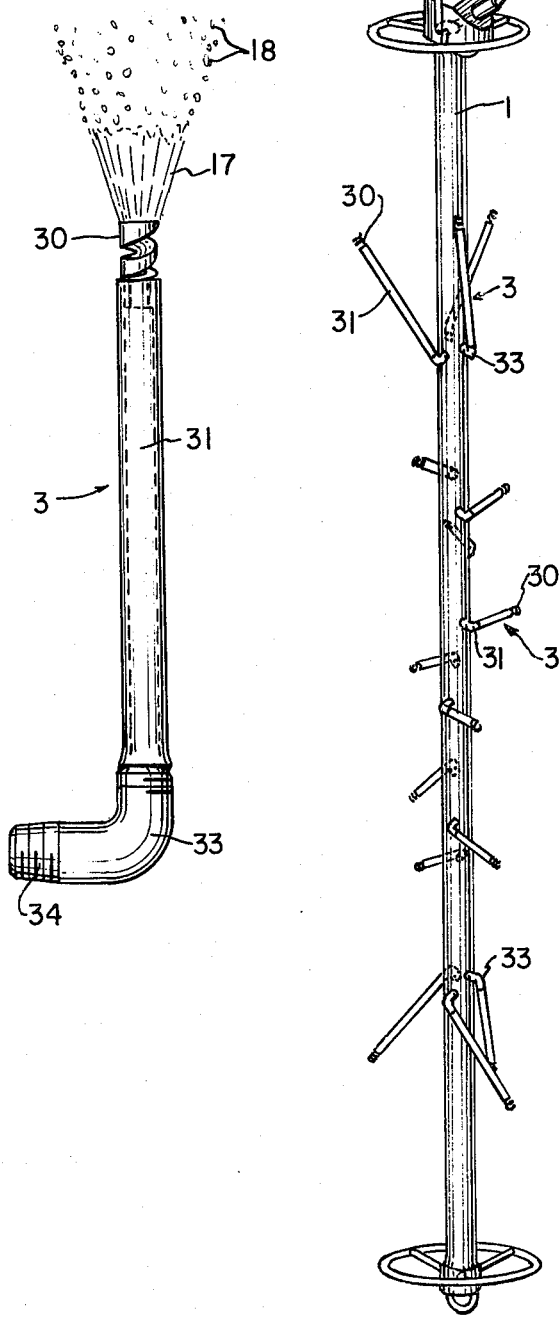

APPARATUS AND METHOD FOR WASHING AWAY AN ELECTROSTATIC CHARGED MIST IN AN OIL TANKER

BACKGROUND OF THE INVENTION

1. Field of the Invention

The present invention relates to apparatus for reducing the strength of an electostatic field.

2. Description of the Prior Art

The apparatus and method of the present invention in providing droplets of water for scrubbing induces a charge on the droplets of a predetermined size, the charge being opposite in polarity to the electrostatic field. The induced charge increases the coalescence of the scrubbing drops with the mist droplets thereby increasing fallout. The spray pattern is predetermined to substantially cover the hold of a tanker.

Several advantages accrue to the use of a chargeinducing mist scrubbing droplets as opposed to the present scrubbing techniques. Commercial scrubbers use drops of about 100 microns in size. Drops that are too large in size cause an inefficient process due to having fewer drops or large water volume requirements. Drops that are too small are also inefficient as drag effects begin slowing impact velocities while mass reduction further reduces the impact momentum and decreases the chance of coalescence upon drop/mist impact. Drop size selection is important in attempting the scrubbing operation.

Commercial scrubbers often obtain much of their scrubbing efficiency by creating high turbulence, causing more frequent droplet impact in the scrubbing zone. Due to the volume, this is not very practical in a typical 105 cubic foot tanker hold. Further, when attempting to scrub a charged mist with an uncharged scrubbing spray, an individual scrubbing drop will become increasingly repulsive of collecting more charged mist since while the scrubber drop is collecting mist, it is also becoming charged the same as the mist.

SUMMARY OF THE INVENTION

Apparatus for reducing the strength of an electrostatic field of a charged mist in a hold in an oil tanker includes a source of liquid which supplies the liquid at a predetermined pressure at a predetermined location in a chamber to be washed. A device distributes the liquid in a manner so that the liquid acquires a charge in the presence of an electrostatic field of a charged mist opposite in polarity to the polarity of the electrostatic field and is converted to drops of a predetermined size. The opposite charge and predetermined drop size enhances coalescence with the charged mist droplets so as to increase the efficiency of washing away the charged mist.

The objects and advantages of the invention will appear more fully hereinafter from the consideration of the detailed description which follows wherein one embodiment of the invention is illustrated by way of example.

DESCRIPTION OF THE DRAWINGS

FIG. 1 shows a system, constructed in accordance with the present invention, for washing away an electrostatically charged mist in an oil tanker.

FIG. 2 shows in detail a nozzle shown in FIG. 1.

DESCRIPTION OF THE INVENTION

In recent years several mammoth oil tankers have experienced explosions. The most probably cause of the explosions has been traced to the existence of an electrostatic field in a substantially empty hold of a tanker, when tank washing activities are carried out, and the subsequent discharge in the presence of an explosive atmosphere. The apparatus and method of the present invention is to substantially reduce the strength of the electrostatic field to a level such that its subsequent discharge, if any, will not cause an explosion.

Referring now to FIG. 1, there is shown a discharge system. A manifold 1, having nozzles 3, is lowered into the hold of a tanker, through one of several openings generally available, to a predetermined depth. For large holds several manifolds with nozzles may be used simultaneously at different locations in the holds. A nozzle 3 is shown in greater detail in FIG. 2. A pump 7 pumps sea water or fresh water through a filter 9 which filters out particles which may clog nozzles 3.

A regulator 14 reduces the pressure of the water from filter 9 to a pressure conducive to providing droplets of a desired size when the water is discharged from nozzles 3. By way of example, the pressure of the water provided by regulator 14 may be within the range of 100 to 200 psi.

Referring also to FIG. 2, the water leaving each nozzle 3 is initially a conical sheet 17 of water before breaking into drops 18. Due to the presence of a strong electrostatic field, water sheet 17 is inductively charged to an opposite polarity from that of the field. As the sheet 17 of water separates into drops 18, each drop 18 has trapped its charge so that it is charged opposite to that of the field.

Referring now to FIG. 2, nozzle 3 is shown in detail. Nozzle 3 includes an outlet section 30 which may be a modified nozzle of the type manufactured by Bete Fog Nozzle Inc., L. series, small spiral, number L-120, and which is shown in FIG. 3. The modification is such as to fit the Bete nozzle to tubing 31. A 90°elbow 33 connects tubing 31 via threads 34 so that nozzle 3 may be mounted on manifold 1.

Manifold 1 may be a length of black pipe having tapped holes at predetermined intervals to facilitate the mounting of nozzles 3. The design of manifold 1 is determined by the volume to be filled with scrubbing drops. The manifold of FIG. 1 can carry fifteen nozzles 3. Nozzles 3 are mounted in groups of three in manifold 1. The direction of discharge of nozzles 3, about the longitudinal axis of manifold 1, for one group is opposite to the direction of discharge for an adjacent group of nozzles 3 to reduce the rotational effect imparted to manifold 1 by the discharging water from nozzles 3. The tapped holes in manifold 1 are also at different directions to achieve the maximum distribution of the scrubbing drops for impact with the charged mist.

The drops impact with the droplets of the charged mist. Since each drop has an opposite charge to that of a mist droplet, the drops and droplets are attracted to each other enhancing the coalescence between the drops and the droplets. Further as a scrubbing drop impacts with a mist droplet, it may still retain a charge thus enhancing its coalescence with another droplet.

The method of the present invention as heretofore described provides scrubbing drops in the presence of an electrostatic field in such a manner so that the drops assume an opposite polarity to the polarity of the electrostatic field. The drops with the aid of the charge and impact coalescence with the charged mist drops to neutralize the charge and to wash the mist away. Thus the method of the present invention improves on the random type of impact heretofore relied on in scrubbing operations.

What is claimed is:

1. Apparatus for washing away an electrostatic charged mist in a substantially empty hold in an oil tanker, comprising means for providing a supply of liquid at a predetermined pressure and at a predetermined location in the hold of the tanker, means for converting the liquid to drops of a predetermined size, utilizing the electrostatic charged mist to charge the drops during the converting step to an opposite polarity to the polarity of the electrostatic charged mist, and means for distributing the oppositely charged drops throughout the hold so as to substantially wash away the charged mist.

2. Apparatus as described in claim 1 in which the converting means includes a plurality of nozzles, each nozzle receiving the liquid and spraying drops.

3. Apparatus as described in claim 2 in which the distributing means is a manifold on which the plurality of nozzles are mounted in a predetermined manner.

4. A method for reducing the strength of an electrostatic field of a charged mist in a substantially empty hold in an oil tanker, which comprises the following steps of providing a supply of liquid at a predetermined pressure at a predetermined location in the hold of the tanker, converting the liquid to drops, utilizing the electrostatic field to change the drops during the converting step to an opposite polarity to the polarity of the electrostatic field, and distributing the oppositely charged drops throughout the hold so as to reduce the strength of the electrostatic field of the charged mist while substantially washing away the charged mist.

5. A method as described in claim 4 in which each converting step includes providing the liquid through an orifice of a predetermined size.

6. A method as described in claim 5 in which the predetermined pressure is within a range of 100 to 200 pounds per square inch.

7. A method as described in claim 6 which further comprises measuring the net strength of the electrostatic field, continuing the aforementioned steps when the measured net strength of the electrostatic field is not less than a predetermined value, and terminating the steps when the measured net strength of the electrostatic field is less than the predetermined value.

* * * * *